United States Patent
Canpolat et al.

(10) Patent No.: US 12,550,180 B2
(45) Date of Patent: Feb. 10, 2026

(54) APPARATUS, SYSTEM, AND METHOD OF COMMUNICATING QUALITY OF SERVICE (QOS) INFORMATION

(71) Applicant: Intel Corporation, Santa Clara, CA (US)

(72) Inventors: Necati Canpolat, Beaverton, OR (US); Dave Cavalcanti, Portland, OR (US); Laurent Cariou, Milizac (FR); Ganesh Venkatesan, Hillsboro, OR (US); Dmitry Akhmetov, Hillsboro, OR (US); Dibakar Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 677 days.

(21) Appl. No.: 17/854,251

(22) Filed: Jun. 30, 2022

(65) Prior Publication Data
US 2022/0330277 A1   Oct. 13, 2022

Related U.S. Application Data

(60) Provisional application No. 63/331,146, filed on Apr. 14, 2022.

(51) Int. Cl.
*H04W 4/00*     (2018.01)
*H04L 5/00*     (2006.01)
*H04W 72/543*   (2023.01)

(52) U.S. Cl.
CPC ......... *H04W 72/543* (2023.01); *H04L 5/0064* (2013.01)

(58) Field of Classification Search
CPC ............ H04W 72/543; H04W 28/0268; H04L 5/0064; H04L 52/0216
See application file for complete search history.

(56) References Cited

U.S. PATENT DOCUMENTS

| | | | |
|---|---|---|---|
| 2011/0103342 A1* | 5/2011 | Cho | H04W 72/21 370/328 |
| 2023/0047109 A1* | 2/2023 | Hsu | H04L 47/2441 |
| 2023/0047705 A1* | 2/2023 | Xin | H04W 74/0808 |
| 2023/0058871 A1* | 2/2023 | Xin | H04W 74/0816 |

(Continued)

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Abdelnabi O Musa
(74) *Attorney, Agent, or Firm* — Shichrur & Co.

(57) ABSTRACT

For example, an apparatus may be configured to cause a wireless communication station (STA) to generate, process and/or communicate one or more frames and/or messages based on a Quality of Service (QoS) index value to indicate a predefined setting of a set of a plurality QoS parameters. In one example, a STA may be configured to transmit a frame including a QoS index value to another STA. In another example, a STA may be configured to process a frame including a QoS index value from another STA.

25 Claims, 12 Drawing Sheets

(56) References Cited

U.S. PATENT DOCUMENTS

| | | | |
|---|---|---|---|
| 2023/0156516 A1* | 5/2023 | Chu | H04W 52/0258 370/230 |
| 2023/0180047 A1* | 6/2023 | Ajami | H04W 52/0216 370/230 |
| 2023/0180052 A1* | 6/2023 | Haider | H04W 28/0268 370/235 |
| 2023/0232274 A1* | 7/2023 | Das | H04W 28/0268 370/229 |
| 2024/0298247 A1* | 9/2024 | Huang | H04W 28/02 |
| 2025/0024316 A1* | 1/2025 | Xue | H04W 28/0252 |

OTHER PUBLICATIONS

IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 1: Enhancements for High-Efficiency WLAN, 2021, 767 Pages.

\* cited by examiner

APPARATUS, SYSTEM, AND METHOD OF COMMUNICATING QUALITY OF SERVICE (QOS) INFORMATION

CROSS REFERENCE

This application claims the benefit of and priority from U.S. Provisional Patent Application No. 63/331,146 entitled "APPARATUS, SYSTEM, AND METHOD OF COMMUNICATING QUALITY OF SERVICE (QOS) INFORMATION", filed Apr. 14, 2022, the entire disclosure of which is incorporated herein by reference.

TECHNICAL FIELD

Aspects described herein generally relate to communicating Quality of Service (QoS) information.

BACKGROUND

Devices in a wireless communication system may be configured to communicate according to communication protocols, which may be configured to support high-throughput data for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
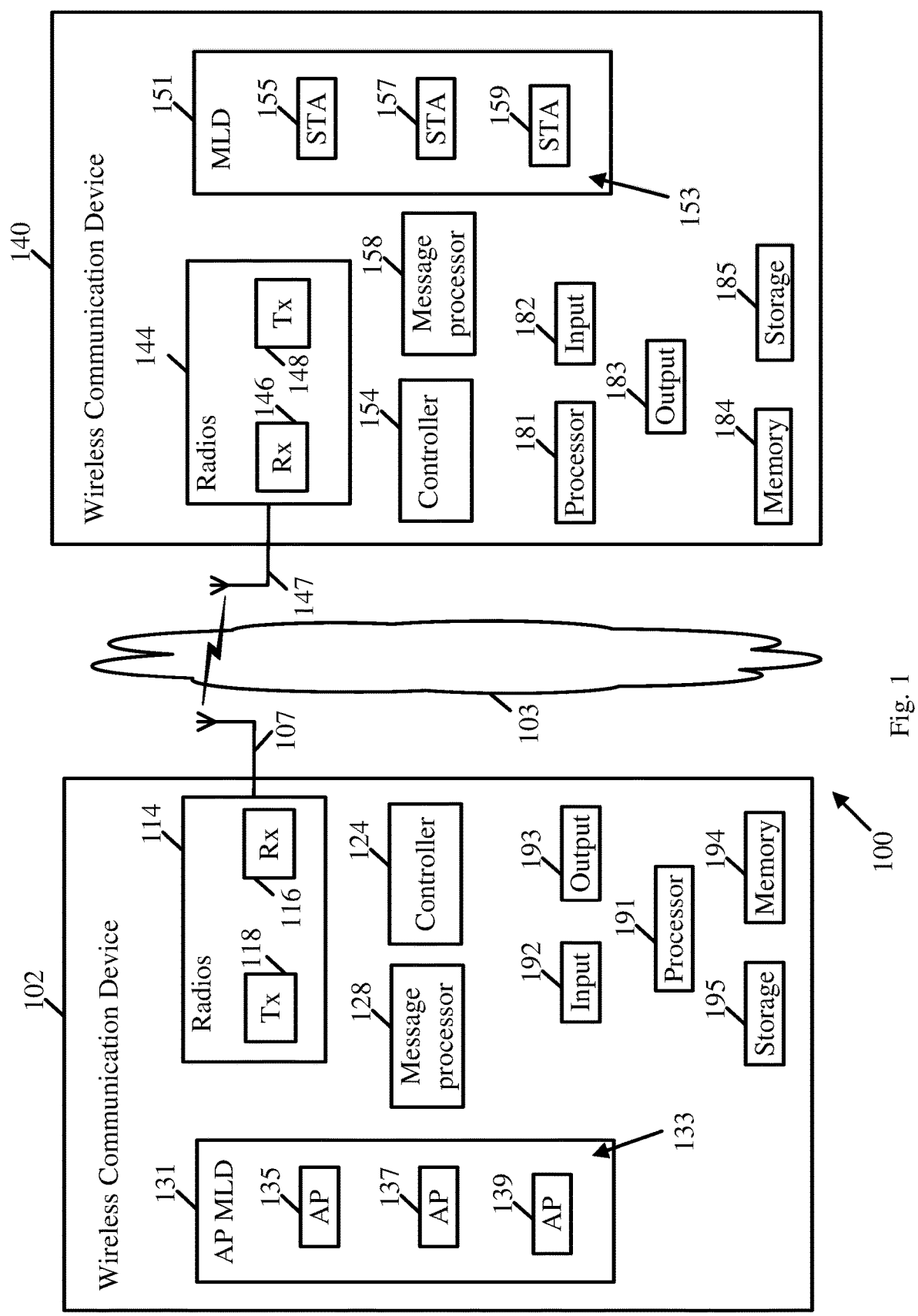
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, *IEEE Standard for Information Technology—Telecommunications and Information Exchange between*

Systems Local and Metropolitan Area Networks—Specific Requirements; Part 11: Wireless LAN Medium Access Control (MAC) and Physical Layer (PHY) Specifications, December, 2020); and/or IEEE 802.11be (IEEE P802.11be/D1.5. *Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)*, March 2022)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™ Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an SlG band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
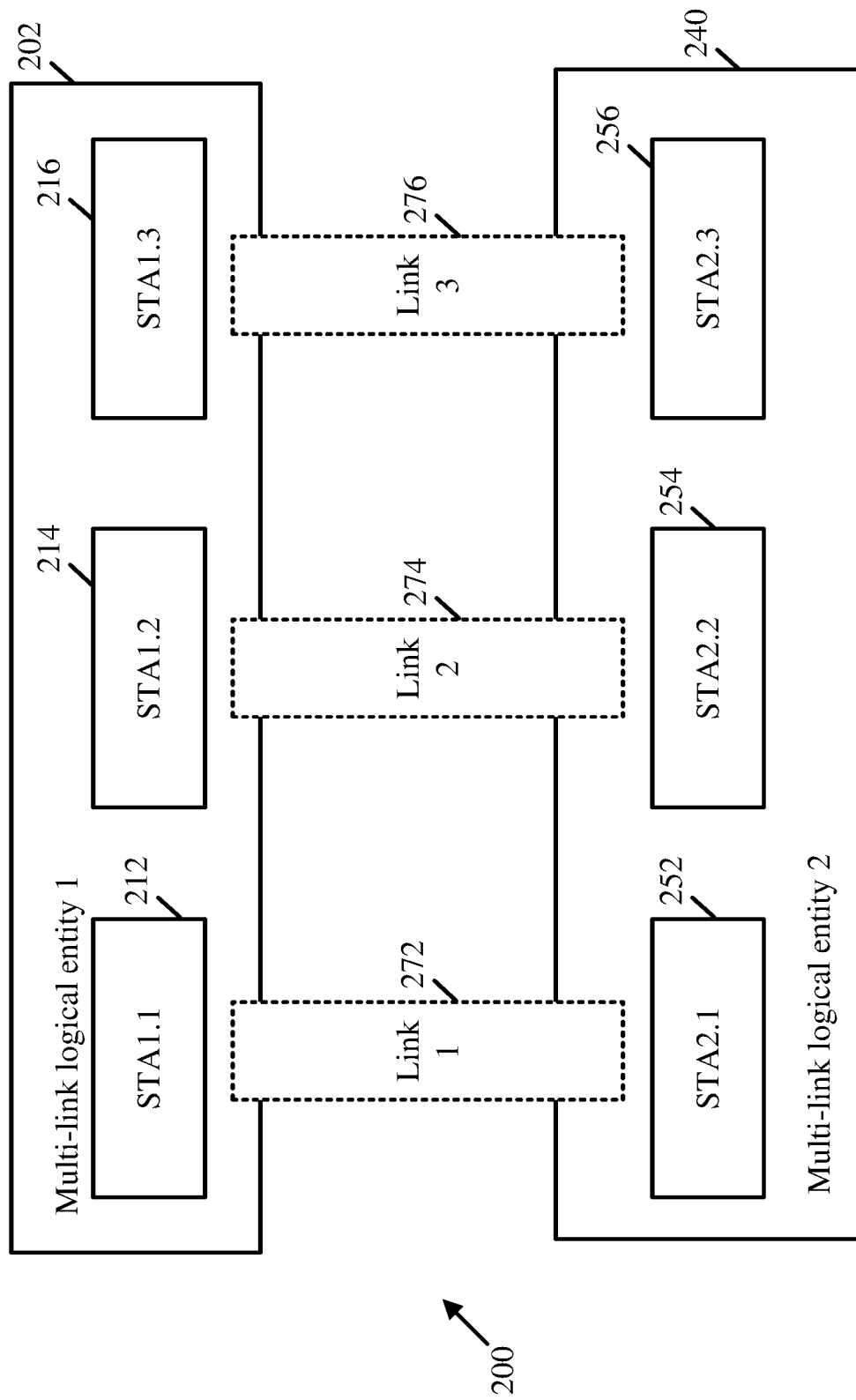
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
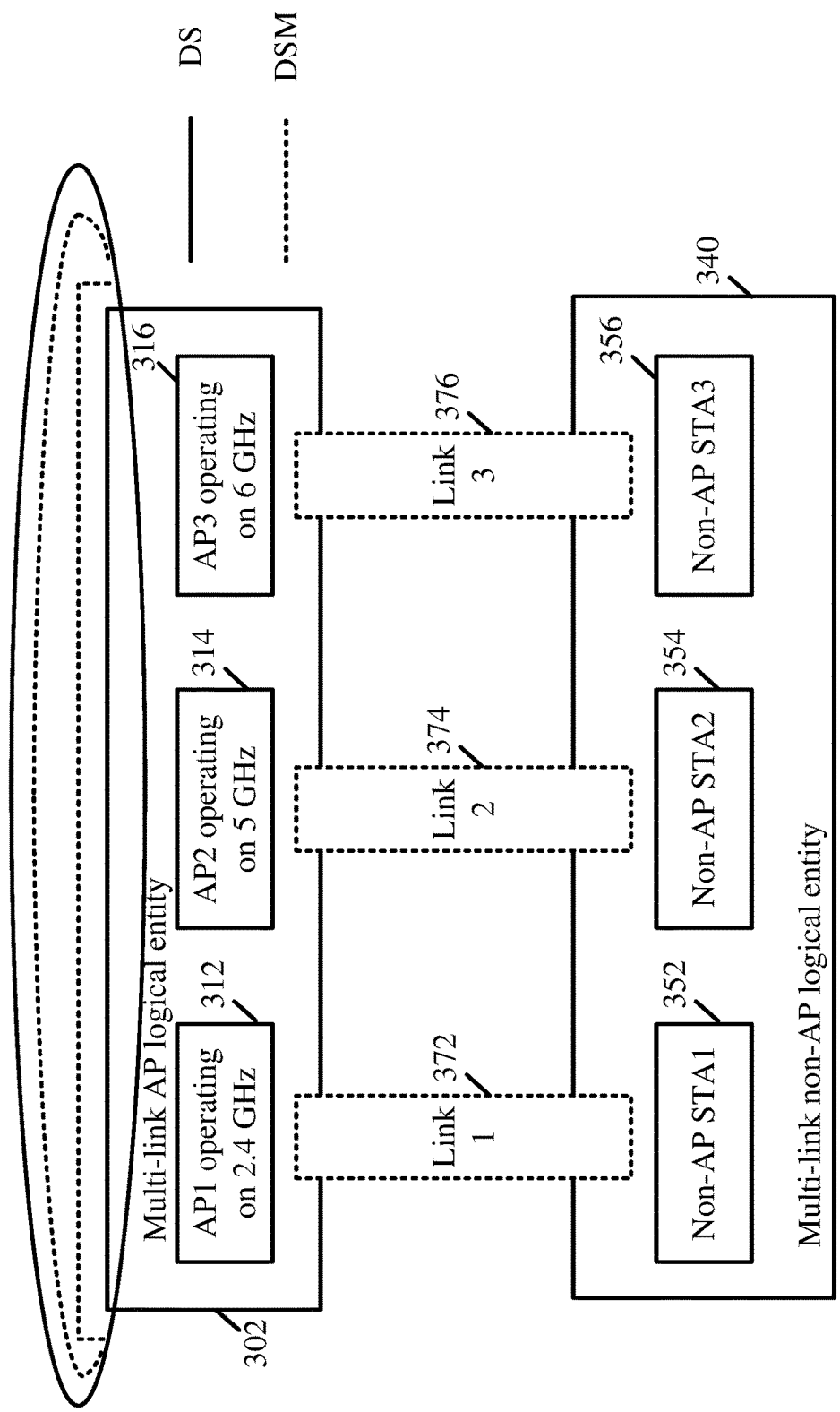
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to implement one or more mechanisms to provide a technical solution to support wireless communication with improved and/or reduced latency, e.g., as described below.

In some demonstrative aspects, devices 102 and/or 140 may be configured to implement one or more mechanisms to provide a technical solution to support improved Quality of Service (QoS) management for wireless communication, e.g., as described below.

In some demonstrative aspects, devices 102 and/or 140 may be configured to implement one or more MAC layer mechanisms to provide a technical solution to support reduced latency and/or QoS management for wireless communication, e.g., as described below.

In some demonstrative aspects, reduced latency and/or QoS management may be achieved, for example, by designing low-latency channel access schemes, e.g., utilizing scheduling and/or any other mechanism.

For example, one or more schemes may be configured, e.g., in accordance with an IEEE 802.11be Specification, for example, on top of multi-user (MU) scheduling mechanisms, e.g., in accordance with an IEEE 802.11ax Specification.

In one example, multi-link operations, e.g., according to an MLD architecture, may be implemented to provide a higher channel access opportunity.

In another example, a 320 MHz Bandwidth (BW) may be used to support lower transmission latency.

In another example, a restricted Target Wake Time (TWT) mechanism may be implemented to improve a STA's chances of "grabbing" a channel, e.g., when it needs to deliver latency-streams.

In some demonstrative aspects, reduced latency and/or QoS management may be achieved, for example, by mapping QoS requirements, e.g., application level and/or Operating System (OS) level QoS requirements, to one or more appropriate resource allocations, e.g., at layer 2.

For example, a Stream Classification Service (SCS) mechanism may be enhanced, e.g., in accordance with an IEEE 802.11be Specification, for example, by allowing a STA to signal its traffic stream characteristics to an AP. For example, the STA may include a QoS parameter element, e.g., a Traffic Specification (TSPEC) element and/or any other element, in a SCS Request frame, e.g., to signal its traffic stream characteristics to an AP. For example, the AP may use this QoS information to make a better allocation, for example, based on received traffic characteristics, e.g., latency bound, data rate or the like.

In some demonstrative aspects, there may be a need to address one or more technical issues when signaling QoS information, e.g., between a STA and an AP.

In one example, while the TSPEC element may provide the traffic characteristics information to a peer STA, there may be a need to address a technical difficulty of STA vendors to fill-in the TSPEC parameters correctly, e.g., based on application layer and/or OS requirements. For example, there may be a need to provide a technical solution to complement the TSPEC based signaling.

In another example, in some implementations, a TSPEC-based design may be semi-static and may not allow a peer STA to adapt to any changing network conditions, e.g., without an explicit signaling. For example, a STA may signal QoS characteristics that work for a current channel condition. However, in some use cases, it may also be fine to work with alternate QoS characteristics, e.g., moving from a high resolution video to low resolution video, for example, if channel congestion increases. However, a design, in which a peer STA is only aware of the change through an explicit update to an existing QoS session, e.g., an SCS stream, may add to overhead.

In some demonstrative aspects, devices 102 and/or 140 may be configured to perform one or more operations and/or communications to support QoS signaling based on a QoS index, e.g., as described below.

In some demonstrative aspects, a plurality of predefined, e.g., typical, traffic characteristics, for example, for some widely used applications, may be predefined and/or statically known at some or all STAs, APs, and/or applications/OS, e.g., as described below.

In some demonstrative aspects, an application and/or an OS, e.g., executed by device 102 and/or device 140, may be configured to indicate an index of a standardized traffic characteristic to a STA and/or AP, e.g., as described below.

In some demonstrative aspects, a STA and/or an AP, e.g., a STA and/or AP implemented by device 102 and/or device 140, may be configured to communicate to its peer STA/AP one or more QoS characteristics corresponding to the QoS index of the TS/AP transmitting the QoS index, e.g., as described below.

In some demonstrative aspects, devices 102 and/or 140 may be configured to utilize the QoS index, for example, to provide a technical solution to support a standardized way to map QoS characteristics, and/or to signal the QoS characteristics in a network, e.g., as described below.

For example, devices 102 and/or 140 may be configured to implement the QoS index to provide a technical solution to support better coexistence among different vendors, and/or to improve resource allocation, e.g., scheduling, which, in turn, may enhance a QoS experience for end-users.

For example, devices 102 and/or 140 may be configured to implement the QoS index to provide a technical solution to support improved internetworking between cellular technologies, e.g., 5G/6G technologies, and WLAN technologies, e.g., WiFi technologies.

In one example, a STA may be connected to a cellular network, e.g., over a trusted or untrusted WLAN link. For example, standardized traffic characteristics corresponding to WLAN traffic characteristics of an application stream may be mapped to corresponding standardized cellular indexes, e.g., 5G QoS Identifier (5QI) values. Accordingly, an element in the cellular network, e.g., a 5G Core Network (5GC), may leverage the QoS index signaling, for example, to specify the QoS requirements for those applications in the WLAN link.

For example, devices 102 and/or 140 may be configured to implement the QoS index to provide a technical solution to support a convenient mechanism for applications to use QoS, for example, by identifying the right application group and/or specifying the identifying index for it, e.g., even without having to go through filling out one or more TSPEC fields.

In some demonstrative aspects, devices 102 and/or 140 may be configured to generate, process and/or communicate a QoS index (also referred to as a Wireless QoS Index (WQI)), e.g., as described below.

In some demonstrative aspects, the QoS index may be configured to indicate a set of QoS traffic parameters including a plurality of QoS traffic parameters, e.g., as escribed below.

In some demonstrative aspects, the QoS index may be defined, generated and/or provided by an application and/or an OS executed by a device, e.g., device 102 and/or device 140, as described below.

In some demonstrative aspects, the QoS Index may be provided to a controller and/or manager of a STA, e.g., a Station Management Entity (SME), an Media Access Control (MAC) Sublayer Management Entity (MLME) of the STA, and/or any other controller, and/or manager of the STA.

In one example, controller 124 may be configured to perform one or more operations of, one or more functionalities of, and/or a role of, an SME and/or an MLME of a STA implemented by device 102, and/or controller 154 may be configured to perform one or more operations of, one or more functionalities of, and/or a role of, an SME and/or an MLME of a STA implemented by device 140.

In some demonstrative aspects, devices 102 and/or 140 may be configured to generate, process and/or communicate one or more frames and/or messages based on a QoS index, e.g., as described below.

In some demonstrative aspects, devices 102 and/or 140 may be configured to generate, process and/or communicate one or more frames and/or messages including a QoS index, e.g., as described below.

In some demonstrative aspects, devices 102 and/or 140 may be configured to generate, process and/or communicate one or more frames and/or messages including one or more information elements, which are based on a QoS index provided by an OS and/or application, e.g., as described below.

In one example, controller 124 may be configured to perform one or more operations of, one or more functionalities of, and/or a role of, an SME and/or an MLME of a STA implemented by device 102, and to generate, process and/or communicate one or more frames and/or messages including one or more information elements, which are based on a QoS index provided by an OS and/or application executed by device 102.

In one example, controller 154 may be configured to perform one or more operations of, one or more functionalities of, and/or a role of, an SME and/or an MLME of a STA implemented by device 140, and to generate, process and/or communicate one or more frames and/or messages including one or more information elements, which are based on a QoS index provided by an OS and/or application executed by device 140.

In some demonstrative aspects, a set of QoS traffic parameters corresponding to typical types and/or settings of traffic streams may be defined, and may be known, e.g., a-priori, at some or all STAs and/or OS. For example, the set of QoS traffic parameters may have an associated index, e.g., a WQI.

In some demonstrative aspects, an MLME, e.g., an MLME of device 102 and/or an MLME of device 140, may be configured to receive and process a request for corresponding traffic, e.g., including the WQI, for example, from an OS.

In some demonstrative aspects, for example, based on receipt of the WQI, the MLME may signal the traffic characteristic corresponding to the WQI value, for example, in a communication to a peer STA, e.g., as described below.

In some demonstrative aspects, device 102 and/or device 140 may be configured to generate, process and/or communicate one or more frames including a QoS index, e.g., the WQI, to signal QoS characteristics for a traffic stream, e.g., as described below.

In some demonstrative aspects, a STA, e.g., a STA implemented by device 102 and/or a STA implemented by device 140, may be configured to signal traffic characteristic information to a peer STA, for example, in an SCS frame, for example, an SCS request frame and/or an SCS response frame, as described below.

In some demonstrative aspects, a STA, e.g., a STA implemented by device 102 and/or a STA implemented by device 140, may be configured to signal traffic characteristic information to a peer STA, for example, by including the QoS index in a frame to the peer STA, e.g., as described below.

For example, the frame may include an SCS frame and/or any other frame, e.g., as described below.

For example, controller 124 may be configured to control a STA implemented by device 102 to signal traffic characteristic information to a peer STA implemented by device 140, for example, by including the QoS index in a frame, e.g., an SCS frame, to the peer STA implemented by device 140, e.g., as described below.

For example, controller 154 may be configured to control a STA implemented by device 140 to signal traffic characteristic information to a peer STA implemented by device 102, for example, by including the QoS index in a frame, e.g., an SCS frame, to the peer STA implemented by device 102, e.g., as described below.

In some demonstrative aspects, a STA, e.g., a STA implemented by device 102 and/or a STA implemented by device 140, may be configured to signal traffic characteristic information to a peer STA, for example, by including in a frame to the peer STA QoS information, which is based on the QoS index from an application and/or OS, e.g., as described below.

For example, the frame may include an SCS frame and/or any other frame, e.g., as described below.

For example, controller 124 may be configured to control a STA implemented by device 102 to signal traffic characteristic information to a peer STA implemented by device 140, for example, by including in a frame to the peer STA implemented by device 140 QoS information, which may be based, for example, on the QoS index from an application and/or OS executed by the device 102, e.g., as described below.

For example, controller 154 may be configured to control a STA implemented by device 140 to signal traffic characteristic information to a peer STA implemented by device 102, for example, by including in a frame to the peer STA implemented by device 102 QoS information, which may be based, for example, on the QoS index from an application and/or OS executed by the device 140, e.g., as described below.

In some demonstrative aspects, a STA, e.g., a STA implemented by device 102 and/or a STA implemented by device 140, may be configured signal one or more alternate QoS parameters to the peer STA, e.g., as described below.

In some demonstrative aspects, the alternate QoS parameters may be included together with the QoS index, for example, in a same information element and/or a same frame, e.g., as described below.

In other aspects, the alternate QoS parameters may be included in an information element, which may be separate from an information element carrying the QoS index, or in a frame, which may be separate from a frame carrying the QoS index.

In some demonstrative aspects, the alternate QoS parameters be configured for use as backup QoS parameters by the STA, for example, in case the QoS requirements corresponding to the QoS index cannot be met, e.g., as described below.

For example, controller 124 may be configured to control a STA implemented by device 102 to signal one or more alternate QoS parameters to the peer STA implemented by device 140, for example, to allow the peer STA implemented by device 140 to use the alternate QoS parameters as backup QoS parameters, for example, in case the QoS requirements corresponding to the QoS index provided by the STA implemented by device 102 cannot be met, e.g., as described below.

For example, controller 154 may be configured to control a STA implemented by device 140 to signal one or more alternate QoS parameters to the peer STA implemented by device 102, for example, to allow the peer STA implemented by device 102 to use the alternate QoS parameters as backup QoS parameters, for example, in case the QoS requirements corresponding to the QoS index provided by the STA implemented by device 140 cannot be met, e.g., as described below.

In some demonstrative aspects, a STA, e.g., a STA implemented by device 140, may be configured to set a QoS index value, e.g., a WQI value, in a QoS index element, e.g., a WQI element, e.g., as described below.

In some demonstrative aspects, the QoS index value, e.g., the WQI value, may be configured to indicate a setting of a set of a plurality of QoS parameters and/or characteristics, e.g., as described below.

In some demonstrative aspects, the QoS index value, e.g., the WQI value, may be configured to indicate a setting of a set of a plurality of QoS parameters and/or characteristics of a traffic stream to be communicated by the STA, e.g., as described below.

In some demonstrative aspects, the QoS index value, e.g., the WQI value, may be configured to indicate a setting of a set of a plurality of QoS parameters and/or characteristics of a traffic stream to be communicated between the STA and a peer STA, e.g., as described below.

In some demonstrative aspects, the QoS index element may be included by a SAT in a frame transmitted from the STA to an AP, for example, to indicate a requested setting of a set of QoS parameters and/or characteristics, which is requested by the STA, e.g., as described below.

In some demonstrative aspects, the QoS index value, e.g., the WQI value, may be configured to indicate a predefined setting of the set of the plurality of QoS parameters and/or characteristics, e.g., as described below.

In some demonstrative aspects, the QoS index value, e.g., the WQI value, may be configured to indicate a predefined setting of the set of QoS parameters and/or characteristics, for example, from a plurality of predefined settings, e.g., as described below.

In some demonstrative aspects, the QoS index value, e.g., the WQI value, may be provided to the STA by an application and/or an OS, for example, according to one or more QoS requirements, e.g., as described below.

In some demonstrative aspects, the QoS index value, e.g., the WQI value, may be determined by the STA, for example, according to one or more QoS requirements, e.g., as described below.

In some demonstrative aspects, the QoS index value, e.g., the WQI value, may be selected from a plurality of predefined QoS index values, e.g., as described below.

In some demonstrative aspects, the QoS index value, e.g., the WQI value, may be selected from the plurality of predefined QoS index values, for example, according to one or more QoS requirements and/or parameters, e.g., as described below.

In some demonstrative aspects, the plurality of predefined QoS index values may correspond to a respective plurality of predefined setting of QoS parameters, e.g., as described below.

In some demonstrative aspects, the plurality of predefined QoS index values may correspond to a plurality of different types of traffic, e.g., as described below.

In some demonstrative aspects, the plurality of predefined QoS index values may correspond to a plurality of different types of QoS requirements, e.g., as described below.

In some demonstrative aspects, the plurality of predefined QoS index values may correspond to a plurality of different channel conditions, e.g., as described below.

In other aspects, some or all of the plurality of predefined QoS index values may be defined based on any other additional or alternative criteria.

In some demonstrative aspects, a STA, e.g., the STA implemented by device 140, may be configured to transmit a frame including the QoS index element, e.g., as described below.

In some demonstrative aspects, the STA, e.g., the STA implemented by device 140, may be configured to transmit the frame including the QoS index element to a peer STA, e.g., as described below.

In some demonstrative aspects, the STA, e.g., the STA implemented by device 140, may be configured to transmit the frame including the QoS index element to an AP, e.g., an AP implemented by device 102.

In other aspects, the frame including the QoS index element may be transmitted to any other additional or alternative type of STA.

In some demonstrative aspects, the STA, e.g., the STA implemented by device 140, may be configured to transmit an SCS frame including the QoS index element, e.g., as described below.

In some demonstrative aspects, the SCS frame may include an SCS request frame, e.g., as described below.

In some demonstrative aspects, the SCS frame may include an SCS response frame, e.g., as described below.

In some demonstrative aspects, the QoS index element may be included in any other additional or alternative type of frame.

In some demonstrative aspects, controller 154 may be configured to control, trigger, instruct, and/or cause a STA implemented by device 140 to set a QoS index value in a QoS index field to indicate a predefined setting of a set of a plurality QoS parameters, e.g., as described below.

In some demonstrative aspects, the set of the plurality QoS parameters may include a packet delay budget, e.g., as described below.

In some demonstrative aspects, the set of the plurality QoS parameters may include a packet error rate, e.g., as described below.

In some demonstrative aspects, the set of the plurality QoS parameters may include at least one of a priority level, a pre-emption capability and vulnerability, a user priority, flow-bit rates, and/or a maximum data burst volume, e.g., as described below.

In some demonstrative aspects, the set of the plurality QoS parameters may include any other additional or alternative QoS parameters.

In some demonstrative aspects, controller 154 may be configured to control, trigger, instruct, and/or cause the STA implemented by device 140 to transmit a frame including the QoS index field, e.g., as described below.

In some demonstrative aspects, controller 154 may be configured to control, trigger, instruct, and/or cause the STA implemented by device 140 to set a QoS index element including the QoS index value, e.g., as described below.

In some demonstrative aspects, the QoS index field may include a Wireless QoS Index (WQI) field, e.g., as described below. In other aspects, any other suitable field may be used.

In some demonstrative aspects, the QoS index element may include an element Identifier (ID) field, a length field, and the QoS index field including the QoS index value, e.g., as described below.

In some demonstrative aspects, controller 154 may be configured to control, trigger, instruct, and/or cause the STA implemented by device 140 to set the QoS index element in the frame, e.g., as described below.

In some demonstrative aspects, the frame including the QoS index field may include an SCS frame of an SCS procedure, e.g., as described below.

In some demonstrative aspects, the SCS frame may include an SCS request frame, e.g., as described below.

In some demonstrative aspects, the SCS frame may include an SCS response frame, e.g., as described below.

In some demonstrative aspects, the frame including the QoS index field may include an SCS descriptor element including the QoS index field, e.g., as described below.

In some demonstrative aspects, the SCS descriptor element may include an element ID field, a length field after the element ID field, an SCS ID field after the length field, a request type field after the SCSID field, and the QoS index field after the SCSID field, e.g., as described below.

In other aspects, the QoS index field may be included in any other SCS descriptor element including any other additional or alternative fields, and/or having any other format.

In some demonstrative aspects, the frame including the QoS index field may include a QoS parameter element, which may include the QoS index field, e.g., as described below.

In some demonstrative aspects, the QoS parameter element may include an element ID field, a length field after the element ID field, and a plurality of QoS parameter fields after the length field, e.g., as described below.

In some demonstrative aspects, the plurality of QoS parameter fields may include the QoS index field, e.g., as described below.

In some demonstrative aspects, the plurality of QoS parameter fields may include a minimum service interval field, a maximum service interval field, and/or a delay bound field, e.g., as described below.

In other aspects, the QoS index field may be included in any other QoS parameter element including any other additional or alternative fields, and/or having any other format.

In other aspects, the frame including the QoS index field may include the QoS index field as part of any other additional or alternative element and/or field.

In other aspects, the frame including the QoS index field may include any other type of frame and/or having any other format.

In some demonstrative aspects, controller 154 may be configured to control, trigger, instruct, and/or cause the STA implemented by device 140 to set a QoS parameter element in the frame including the QoS index value, for example, to indicate an alternate QoS parameter setting, e.g., as described below.

In some demonstrative aspects, alternate QoS parameter setting may be used as an alternative to the setting of the one or more QoS parameters in the set of QoS parameters indicated by the QoS index value, e.g., as described below.

some demonstrative aspects, controller 154 may be configured to control, trigger, instruct, and/or cause the STA implemented by device 140 to select the QoS index value from a plurality of predefined QoS index values, for example, based on one or more QoS requirements for wireless communication of traffic between the STA implemented by device 140 and another STA, e.g., a STA implemented by device 102, as described below.

In some demonstrative aspects, the plurality of predefined QoS index values may represent a respective plurality of different predefined settings of the set of the plurality QoS parameters, e.g., as described below.

In some demonstrative aspects, the plurality of predefined QoS index values may include a first QoS index value corresponding to first QoS requirements of a first traffic type, e.g., as described below.

In some demonstrative aspects, the plurality of predefined QoS index values may include a second QoS index value corresponding to second QoS requirements of a second traffic type, e.g., as described below.

In some demonstrative aspects, the second traffic type may be different from the first traffic type, e.g., as described below.

In some demonstrative aspects, the second QoS requirements may be different from the first QoS requirements, e.g., as described below.

In some demonstrative aspects, the plurality of predefined QoS index values may include a first QoS index value corresponding to first QoS requirements for a first channel condition of a wireless communication channel to communicate the traffic, e.g., as described below.

In some demonstrative aspects, the plurality of predefined QoS index values may include a second QoS index value corresponding to second QoS requirements for a second channel condition of the wireless communication channel, e.g., as described below.

In some demonstrative aspects, the second channel condition may be different from the first channel condition, e.g., as described below.

In some demonstrative aspects, the second QoS requirements corresponding to the second QoS index value may be different from the first QoS requirements corresponding to the first QoS index value, e.g., as described below.

In some demonstrative aspects, controller 124 may be configured to control, trigger, instruct, and/or cause the STA implemented by device 102 to process a frame including the QoS index field, e.g., as described below.

In some demonstrative aspects, controller 124 may be configured to control, trigger, instruct, and/or cause the STA implemented by device 102 to process the frame from device 140 including the QoS index field, e.g., as described below.

In some demonstrative aspects, controller 124 may be configured to control, trigger, instruct, and/or cause the STA implemented by device 102 to determine a predefined setting of a set of a plurality QoS parameters based on the QoS index value in the received frame, e.g., as described below.

In some demonstrative aspects, controller 124 may be configured to control, trigger, instruct, and/or cause the STA implemented by device 102 to identify a QoS index value in a QoS index field in a first frame, which may be received by the STA from an other STA, e.g., from the STA implemented by device 140.

In some demonstrative aspects, controller 124 may be configured to control, trigger, instruct, and/or cause the STA implemented by device 102 to determine a predefined setting of a set of a plurality QoS parameters based on the QoS index value in the first frame, e.g., as described below.

In some demonstrative aspects, controller 124 may be configured to control, trigger, instruct, and/or cause the STA implemented by device 102 to transmit a second frame to the other STA, for example, based on the predefined setting of the set of the plurality QoS parameters, e.g., as described below.

For example, controller 124 may be configured to control, trigger, instruct, and/or cause the STA implemented by device 102 to transmit a second frame to the STA implemented by device 140, for example, based on the predefined setting of the set of the plurality QoS parameters determined according to the QoS index value in the first frame received from the STA implemented by device 140.

In some demonstrative aspects, the first frame and the second frame may include SCS frames of an SCS procedure, e.g., as described below.

In some demonstrative aspects, the first frame may include an SCS request frame and the second frame may include an SCS response frame, e.g., in response to the SCS request frame, as described below.

In other aspects, the first frame and/or the second frame may include any other type of frames.

In some demonstrative aspects, controller 124 may be configured to control, trigger, instruct, and/or cause the STA implemented by device 102 to select the predefined setting of the set of the plurality QoS parameters corresponding to the QoS index value in the first frame from a plurality of different predefined settings of the set of the plurality QoS parameters, e.g., as described below.

In some demonstrative aspects, the plurality of different predefined settings of the set of the plurality QoS parameters may correspond to a respective plurality of predefined QoS index values, e.g., as described above.

In some demonstrative aspects, controller 124 may be configured to control, trigger, instruct, and/or cause the STA implemented by device 102 to identify, e.g., based on a QoS parameter element in the frame, an alternate QoS parameter setting to be used as an alternative to the setting of the one or more QoS parameters in the set of QoS parameters indicated by the QoS index value in the first frame, e.g., as described below.

In some demonstrative aspects, controller 154 may be configured to control, trigger, instruct, and/or cause the STA implemented by device 140 to process a QoS index value, for example, from an application or an operating system executed by device 102, e.g., as described below.

In some demonstrative aspects, the QoS index value may correspond to, and/or may represent, one or more QoS requirements of the application or operating system executed by device 102.

In some demonstrative aspects, controller 154 may be configured to control, trigger, instruct, and/or cause the STA implemented by device 140 to determine a predefined setting of a set of a plurality QoS parameters based, for example, on the received QoS index value.

In some demonstrative aspects, controller 154 may be configured to control, trigger, instruct, and/or cause the STA implemented by device 140 to transmit a frame including a QoS parameter element configured to indicate the setting of the set of the plurality of QoS parameters, which was determined based on the received QoS index value, e.g., as described below.

In some demonstrative aspects, the frame including the QoS parameter element may include an SCS frame of an SCS procedure, e.g., as described below.

In some demonstrative aspects, the SCS frame may include an SCS request frame, e.g., as described below.

In some demonstrative aspects, the SCS frame may include an SCS response frame, e.g., as described below.

In other aspects, any other type of frame and/or any other frame format may be used to carry the QoS parameter element configured to indicate the setting of the set of the plurality of QoS parameters, which was determined based on the received QoS index value.

In some demonstrative aspects, controller 154 may be configured to control, trigger, instruct, and/or cause the STA implemented by device 140 to select the predefined setting of the set of the plurality QoS parameters corresponding to the received QoS index value from a plurality of different predefined settings of the set of the plurality QoS parameters, e.g., as described below.

In some demonstrative aspects, the plurality of different predefined settings of the set of the plurality QoS parameters may correspond to a respective plurality of predefined QoS index values, e.g., as described above.

In some demonstrative aspects, one or more standardized parameters that are associated with a particular WQI value may include, may be based on, and/or may be similar to, one or more parameters of a standardized 5QI to 5G QoS characteristics mapping, which may be adopted for WLAN layer-2.

In some demonstrative aspects, the QoS index value, e.g., the WQI value, may be configured to indicate a setting of a set of a plurality of QoS parameters and/or characteristics for a stream, e.g., including one or more of the following QoS parameters:

Packet Delay Budget: this parameter may correspond, for example, to the maximum layer-2 latency for packets in this stream Packet Error Rate: this parameter may indicate, for example, the maximum packet loss rate that the stream can tolerate at layer-2. For example, packets which are not delivered within a latency bound can also be considered to be lost.

Priority Level: this parameter may indicate, for example, a relative priority of scheduling resources, for example, in case of resource constraints a stream with lower priority may be dropped in favor of a high priority one.

Pre-emption capability and vulnerability: this parameter may indicate, for example, whether packets of this stream can be pre-empted or can pre-empt other streams with lower Priority Level.

User Priority: this parameter may indicate, for example, the User Priority to be used for this stream.

Flow Bit Rates: this parameter may indicate, for example, a max and/or a guaranteed flow bit rate for this stream Maximum Data Burst Volume: this parameter may indicate, for example, the largest amount of data to be served within a given period for this stream.

Any other additional or alternative parameter.

In some demonstrative aspects, for example, a predefined WQI value, e.g., a WQI value of 3 or any other value, may be defined to correspond to a real time gaming application, and/or any other application, and may be configured to have a plurality of default parameters representing a predefined setting of a plurality of QoS parameters, e.g., as follows:

Priority Level=30

Packet Delay Budget=5 milliseconds (ms)

Packet Error Rate=10-3

Other parameters=N/A or reserved.

In other aspects, the WQI value may be defined to represent any other values for the parameters and/or any other additional or alternative parameters.

In some demonstrative aspects, an OS and/or an application of a device, e.g., an OS and/or an application of device 102, and/or an OS and/or an application of device 140, may provide, e.g., directly provide, the WQI information to an SME of the device.

In some demonstrative aspects, the SME may derive the corresponding WQI value, for example, on an implementation-specific manner, for example, based on other parameters, e.g., a destination end-point, port number, or the like.

In some demonstrative aspects, a STA, e.g., a STA implemented by device 102 and/or a STA implemented by device 140, may be configured to signal the traffic characteristics corresponding to a WQI value to a peer STA, e.g., as described below.

In some demonstrative aspects, a STA, e.g., a STA implemented by device 102 and/or a STA implemented by device 140, may be configured to signal the traffic characteristics corresponding to a WQI value, for example, as part of a SCS descriptor of an SCS request sent to the peer station.

In some demonstrative aspects, the STA may be configured to signal the WQI information, for example, instead of TSPEC information in the SCS Descriptor of an SCS Request sent to the peer STA.

In some demonstrative aspects, the WQI value may correspond to an SCS identifier (ID) (SCSID), for example, if a specific set of SCSIDs are set aside for the standardized WQI values.

In some demonstrative aspects, the STA may be configured to signal the WQI information, for example, by populating QoS parameters, e.g., TSPEC parameters, according to the traffic characteristic corresponding to the WQI value.

In some demonstrative aspects, one or more other parameters of a QoS element, e.g., TSPEC parameters of a TSPEC element, may be either reserved or provided a value, e.g., if available.

In some demonstrative aspects, a QoS parameter element, e.g., a TSPEC element, may be configured to include one or more new parameters such as, for example, a Pre-emption capability and vulnerability, which is not present in a baseline TSPEC configuration.

In some demonstrative aspects, the STA may be configured to signal the WQI information, for example, by including both the WQI value along with a corresponding QoS element, e.g., a TSPEC element.

In some demonstrative aspects, the STA may be configured, for example, to populate one or more standardized parameters of the QoS element, e.g., the TSPEC element, with same values as those corresponding to the WQI value.

In some demonstrative aspects, the STA, e.g., the STA implemented by device 102 and/or the STA implemented by device 140, may be configured to signal one or more alternate QoS parameters, for example, using one or more QoS elements, e.g., TSPEC element(s), which may be included in the SCS Request and/or SCS Response frames. In one example, an alternate QoS parameter, e.g., each such alternate QoS parameters, may have its own ID.

In some demonstrative aspects, one or more, e.g., some or all, of the alternate QoS parameters, may include specific QoS parameters, e.g., PDR, latency bound, or the like, which may change during operation, e.g., while other QoS Parameters may be likely to remain unchanged.

In some demonstrative aspects, a STA, e.g., the STA transmitting the WQI value and/or its peer STA, may later signal a change of the corresponding parameters during a session, for example, using an SCS update and/or any other mechanism.

Figure 4:
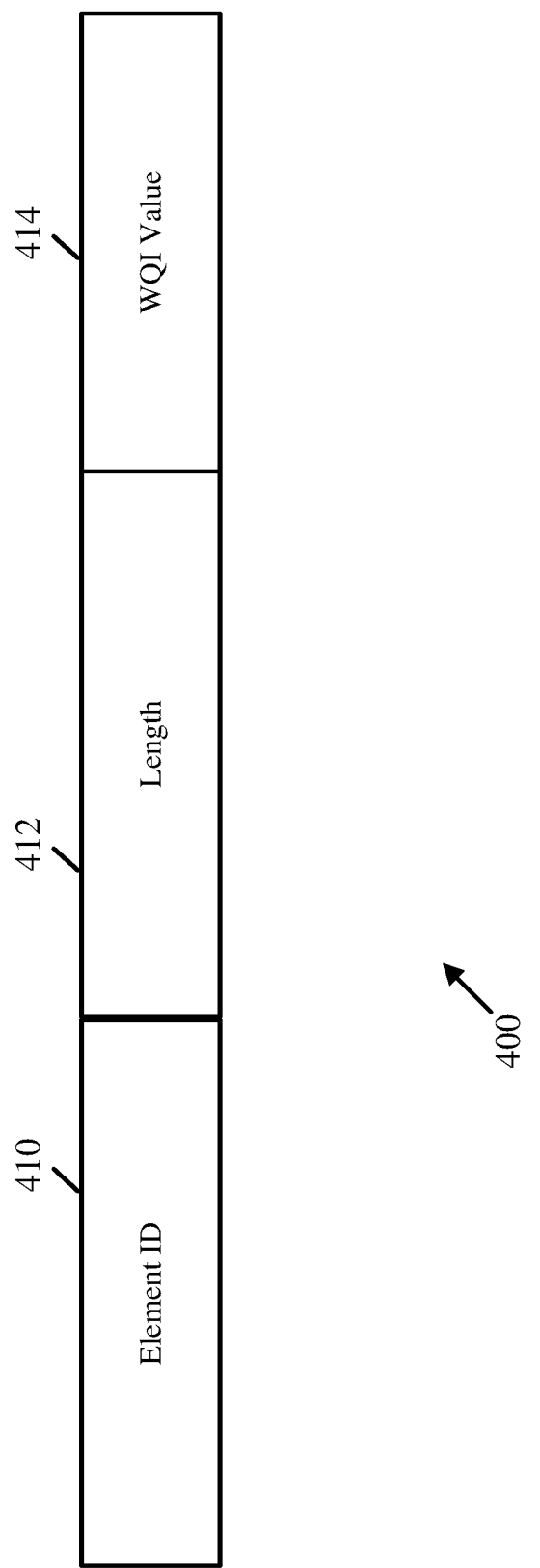
FIG. 4 is a schematic illustration of a Quality of Service (QoS) index element, in accordance with some demonstrative aspects.

Reference is made to FIG. 4, which schematically illustrates a QoS index element 400, in accordance with some demonstrative aspects. For example, device 102 (FIG. 1) and/or device 140 (FIG. 1) may be configured to generate, process and/or communicate one or more frames and/or messages including the QoS index element 400.

In some demonstrative aspects, as shown in FIG. 4, the QoS index element 400 may include a QoS Index value 414.

In some demonstrative aspects, a STA, e.g., a STA implemented by device 102 (FIG. 1) and/or a STA implemented by device 140 (FIG. 1), may be configured to set the QoS Index value 414 to indicate a predefined setting of a set of a plurality QoS parameters, e.g., as described above.

In some demonstrative aspects, as shown in FIG. 4, the QoS index element 400 may include an element ID field 410, a length field 412 after the element ID field 410, and the QoS Index value 414, for example, after the length field 412.

Figure 5:
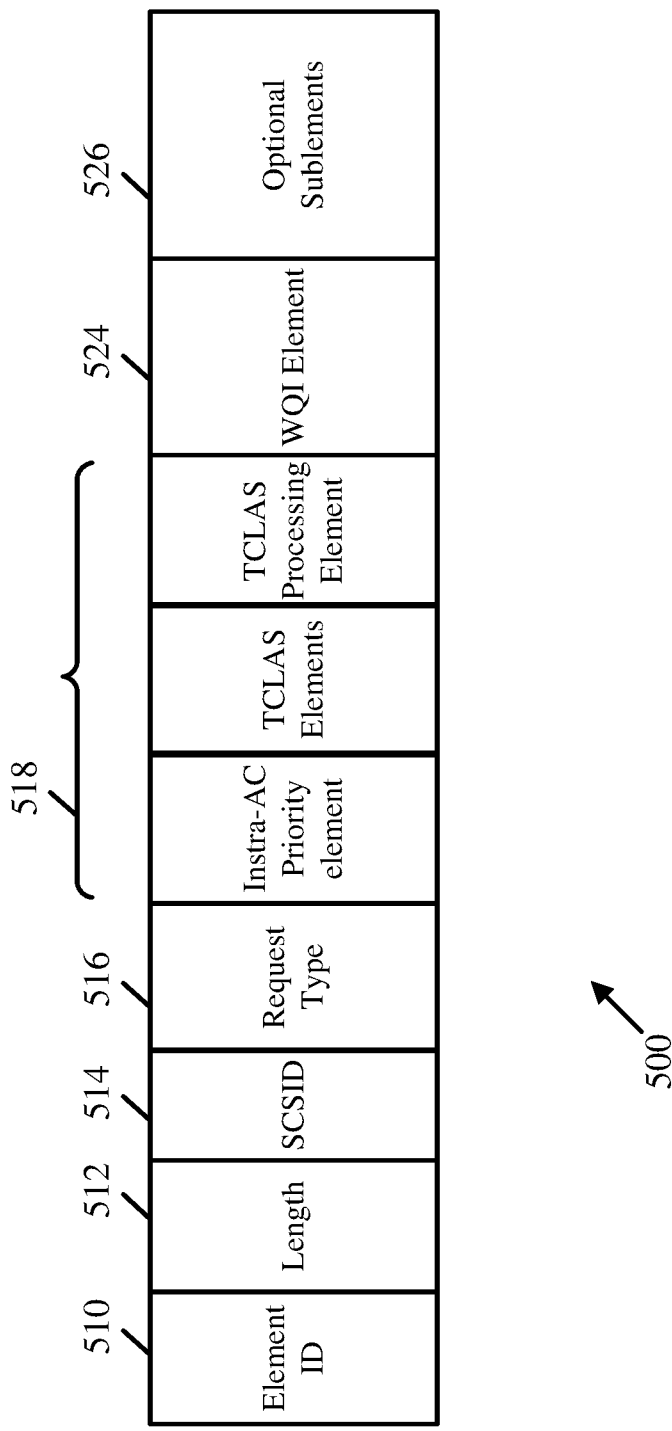
FIG. 5 is a schematic illustration of a Stream Classification Service (SCS) Descriptor element, in accordance with some demonstrative aspects.

Reference is made to FIG. 5, which schematically illustrates an SCS Descriptor element 500, in accordance with some demonstrative aspects. For example, device 102 (FIG. 1) and/or device 140 (FIG. 1) may be configured to generate, process and/or communicate one or more frames and/or messages including the SCS descriptor element 500.

In some demonstrative aspects, as shown in FIG. 5, the SCS descriptor element may include a QoS Index element 524, for example, the WQI element of FIG. 4, e.g., as described above.

In some demonstrative aspects, as shown in FIG. 5, the SCS Descriptor element 500 may be configured to include the QoS Index element 524 as a new element, which may include the WQI value.

In some demonstrative aspects, as shown in FIG. 5, the SCS Descriptor element 500 may include an element ID field 510, a length field 512 after the element ID field 410, an SCS ID (SCSID) field 514 after the length field 512, a request type field 516 after the SCSID field 514, and one or more predefined parameter elements and/or fields 518 after the request type field 516.

In some demonstrative aspects, as shown in FIG. 5, the QoS Index element 524 may be included in the SCS Descriptor element 500, for example, after the one or more predefined parameter elements and/or fields 518.

In some demonstrative aspects, as shown in FIG. 5, the SCS Descriptor element 500 may include one or more optional/reserved subelements 526, e.g., after the QoS Index element 524.

In some demonstrative aspects, a QoS parameter element, e.g., a TSPEC element, may not present in the SCS descriptor element 500 in this case. In other aspects, one or more QoS parameters of the QoS parameter element, e.g., the TSPEC element, may present in the SCS descriptor element 500.

Figure 6:
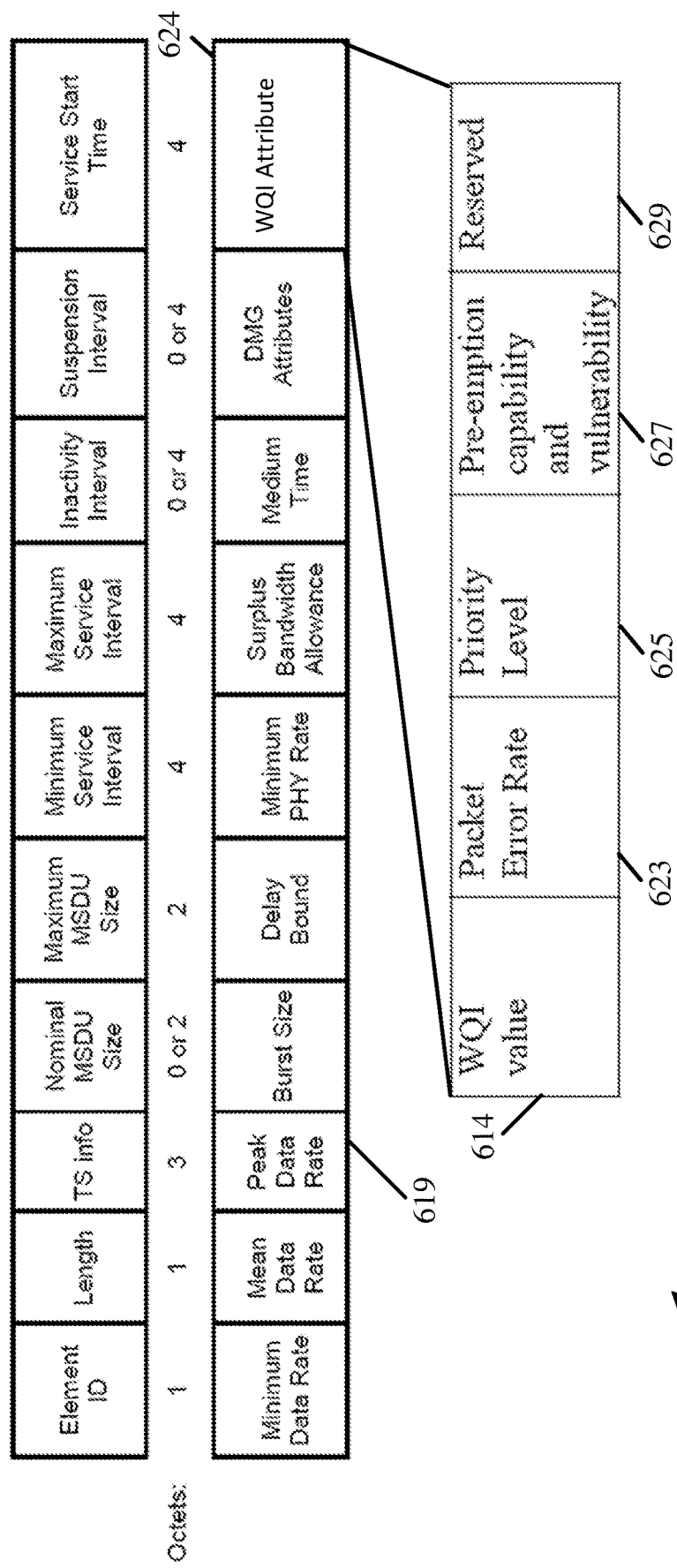
FIG. 6 is a schematic illustration of an information element, in accordance with some demonstrative aspects.

Reference is made to FIG. 6, which schematically illustrates an information element 600, in accordance with some demonstrative aspects. For example, device 102 (FIG. 1) and/or device 140 (FIG. 1) may be configured to generate, process and/or communicate one or more frames and/or messages including the information element 600.

In some demonstrative aspects, the information element 600 may include a QoS parameters information element including information on QoS parameters.

In some demonstrative aspects, the information element 600 may include a TSPEC element.

In some demonstrative aspects, as shown in FIG. 6, the information element 600 may include a field, e.g., a new field, which may be configured to signal QoS Index information, e.g., WQI information.

In some demonstrative aspects, as shown in FIG. 6, the information element 600 may include an attribute 624, e.g., a WQI attribute, which may be configured to include QoS parameter information, for example, including the QoS index value 614, e.g., as described above.

In some demonstrative aspects, a STA, e.g., a STA implemented by device 102 (FIG. 1) and/or a STA implemented by device 140 (FIG. 1), may be configured to set the QoS Index value 614 to indicate a predefined setting of a set of a plurality QoS parameters, e.g., as described above.

In some demonstrative aspects, as shown in FIG. 6, the attribute 624 may be configured to include one or more additional fields, for example, a packet error rate field 623, a priority level field 625, a Pre-Emption capability and vulnerability field 627, and/or one or more additional or reserved field 629.

In some demonstrative aspects, some information associated with the WQI may be signaled using existing fields in the information element 600, e.g., fields of a QoS parameter element or a TSPEC element. In one example, a Peak Data Rate field 619 may be utilized to signal a max Flow Bit Rate.

In some demonstrative aspects, if the WQI value 614 is included, one or more other fields may be reserved or not present, or vice-versa.

Figure 7:
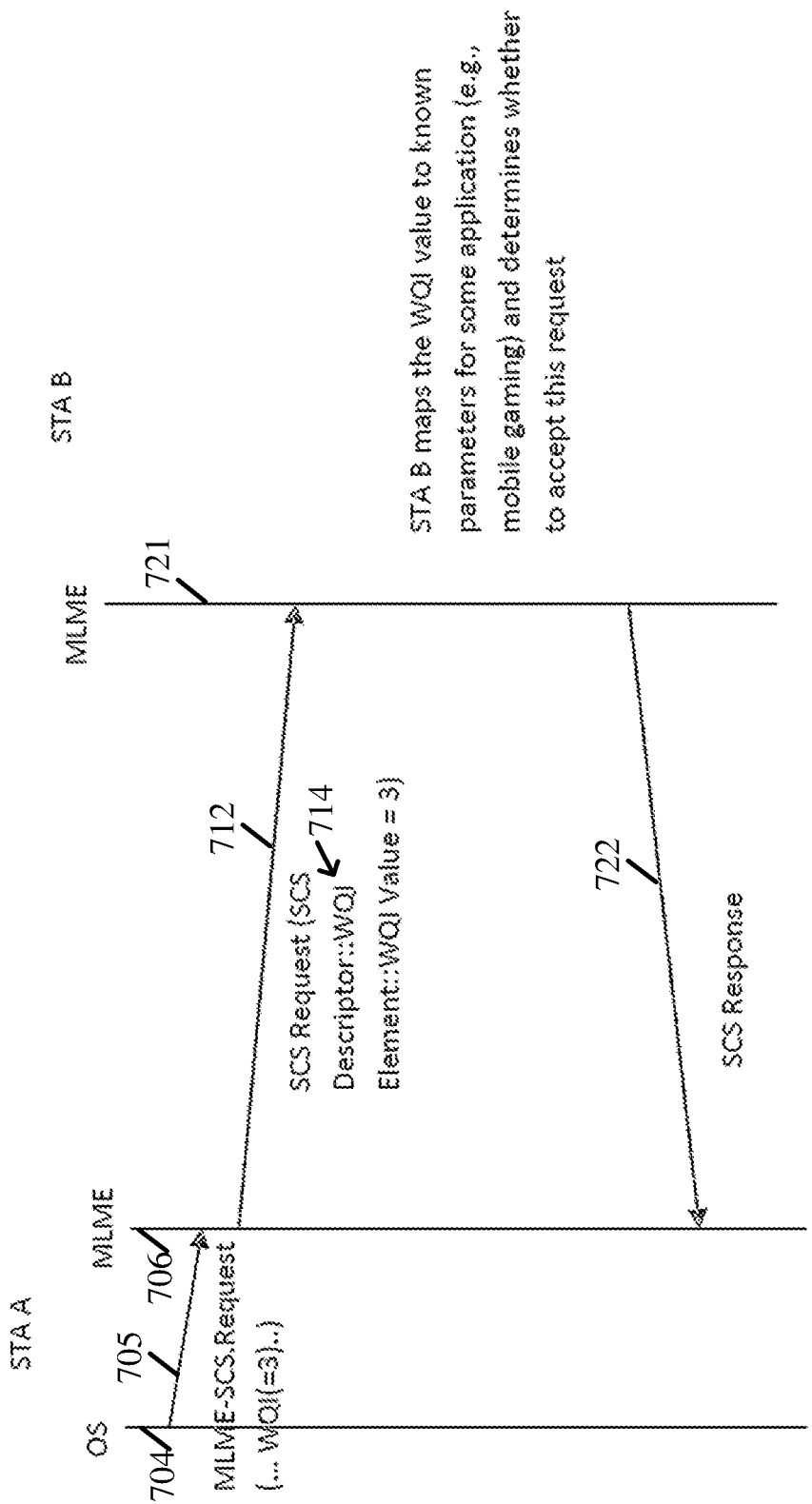
FIG. 7 is a schematic illustration of QoS parameter signaling between a first wireless communication station (STA) and a second STA, in accordance with some demonstrative aspects.

Reference is made to FIG. 7, which schematically illustrates a QoS parameter signaling between a first STA (STA A) and a second STA (STA B), in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1). In one example, device 140 (FIG. 1) may be configured to perform one or more operations of the first STA (STA A), and/or device 102 (FIG. 1) may be configured to perform one or more operations of the second STA (STA B).

In some demonstrative aspects, as shown in FIG. 7, an SCS request signaling may include a QoS index element, e.g., the QoS index element 400 (FIG. 4).

In some demonstrative aspects, as shown in FIG. 7, an OS 704 of the STA A may provide to an MLME 706 of the STA A an MLME-SCS.Request message 705 including an indication of a QoS index value, e.g., the WQI value WQI=3.

In some demonstrative aspects, as shown in FIG. 7, the STA A may send an SCS request 712 to the STA B, e.g., based on the MLME-SCS.Request message 705.

In some demonstrative aspects, as shown in FIG. 7, the SCS request 712 may include an SCS descriptor, e.g., the SCS descriptor element 500 (FIG. 5), including a WQI element 714. For example, the STA A may set the WQI element 714 to include the WQI value indicated by the MLME-SCS.Request message 705, e.g., the WQI value WQI=3.

In some demonstrative aspects, the STA B may be configured to map the WQI value in the received SCS request 712 to known QoS parameters for some application, e.g., a mobile gaming application. For example, an MLME 721 of the STA B may determine whether to accept the SCS request 712 according to the QoS parameters corresponding to the WQI value.

In some demonstrative aspects, the MLME 721 of the STA B may be configured to determine a predefined setting of a set of a plurality QoS parameters based on the QoS index value in the SCS request 712, e.g., as described above.

In some demonstrative aspects, as shown in FIG. 7, the MLME 721 of the STA B may be configured to transmit an SCS response 722 to the STA A, for example, based on the determined predefined setting of the set of the plurality QoS parameters according to the QoS index value in the SCS request 712, e.g., as described above.

Figure 8:
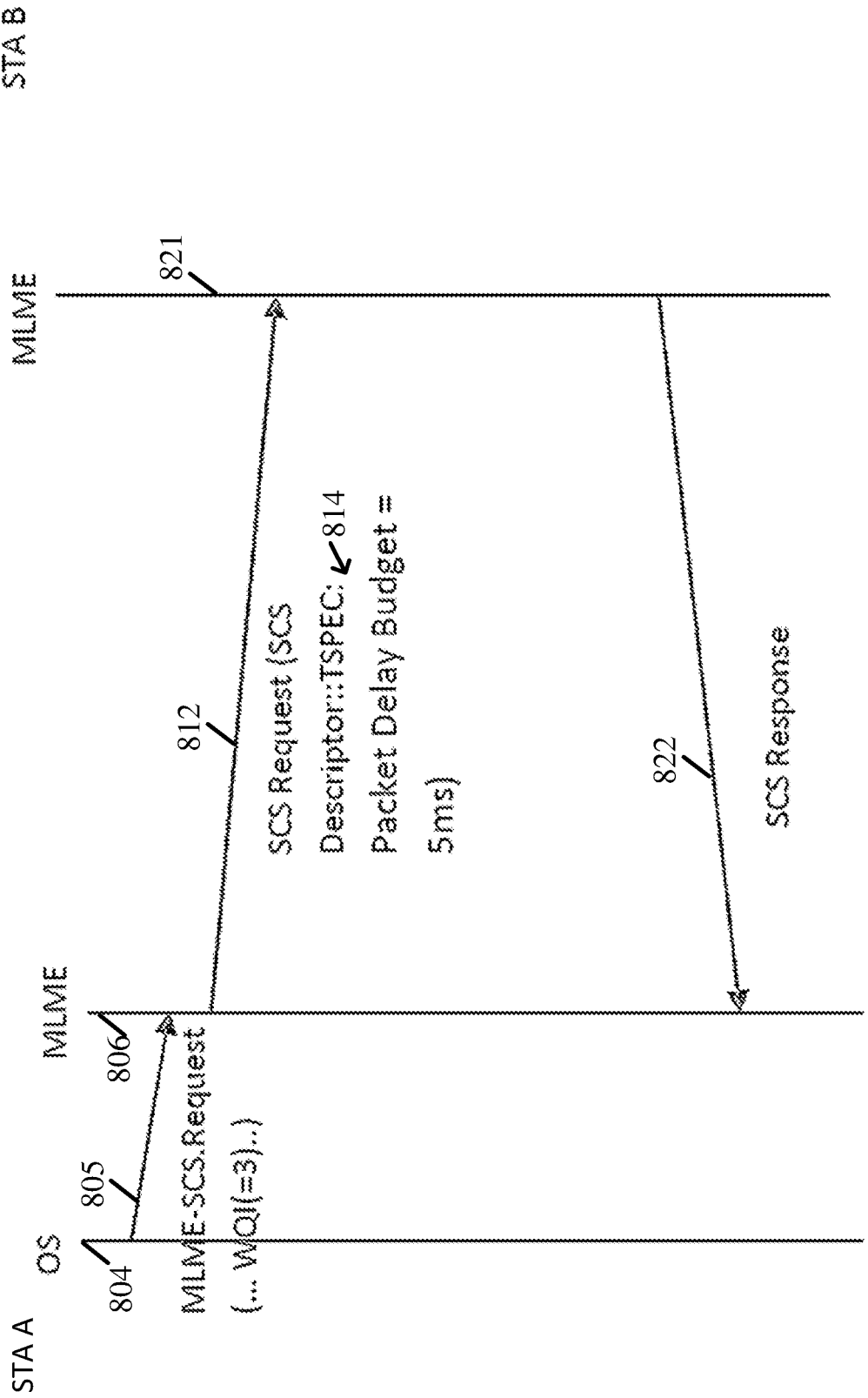
FIG. 8 is a schematic illustration of QoS parameter signaling between a first STA and a second STA, in accordance with some demonstrative aspects.

Reference is made to FIG. 8, which schematically illustrates a QoS parameter signaling between a first STA (STA A) and a second STA (STA B), in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1). In one example, device 140 (FIG. 1) may be configured to perform one or more operations of the first STA (STA A), and/or device 102 (FIG. 1) may be configured to perform one or more operations of the second STA (STA B).

In some demonstrative aspects, as shown in FIG. 8, an SCS request signaling may include a QoS index element, e.g., the QoS Index value 614 (FIG. 6).

In some demonstrative aspects, as shown in FIG. 8, an OS 704 of the STA A may provide to an MLME 806 of the STA A an MLME-SCS.Request message 805 including an indication of a QoS index value, e.g., the WQI value WQI=3.

In some demonstrative aspects, as shown in FIG. 8, the STA A may send an SCS request 812 to the STA B, e.g., based on the MLME-SCS.Request message 805.

In some demonstrative aspects, as shown in FIG. 8, the SCS request 812 may include an SCS descriptor 814 including a QoS parameter element, e.g., a TSPEC element, which may be set by the MLME 806 of the STA A to include QoS parameters corresponding to the QoS Index value indicated by the MLME-SCS.Request message 805, e.g., the WQI value WQI=3.

In some demonstrative aspects, as shown in FIG. 8, an MLME 821 of the STA B may be configured to transmit an SCS response 822 to the STA A, for example, based on the QoS parameters in the SCS descriptor 814 of the SCS request 812, e.g., as described above.

Figure 9:
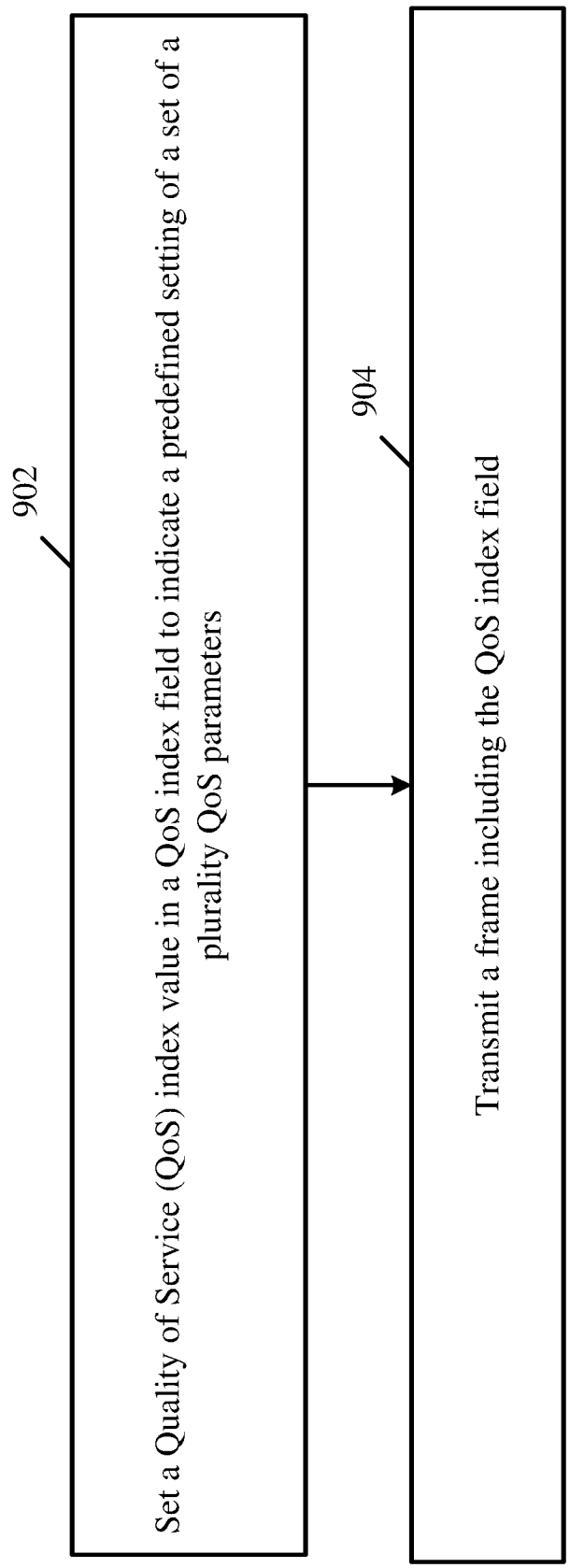
FIG. 9 is a schematic flow-chart illustration of a method of communicating QoS information, in accordance with some demonstrative aspects.

Reference is made to FIG. 9, which schematically illustrates a method of communicating a QoS index, in accordance with some demonstrative aspects. For example, one or more of the operations of the method of FIG. 9 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include setting a QoS index value in a QoS index field to indicate a predefined setting of a set of a plurality QoS parameters. For example, controller 154 (FIG. 1) may be configured to cause the STA implemented by device 140 (FIG. 1) to set a QoS index value, e.g., a WQI value, in a QoS index element, e.g., a WQI element, e.g., as described above.

As indicated at block 904, the method may include transmitting a frame including the QoS index element. For example, controller 154 (FIG. 1) may be configured to cause the STA implemented by device 140 (FIG. 1) to transmit a frame, e.g., an SCS frame or any other frame, including the QoS index element, e.g., as described above.

Figure 10:
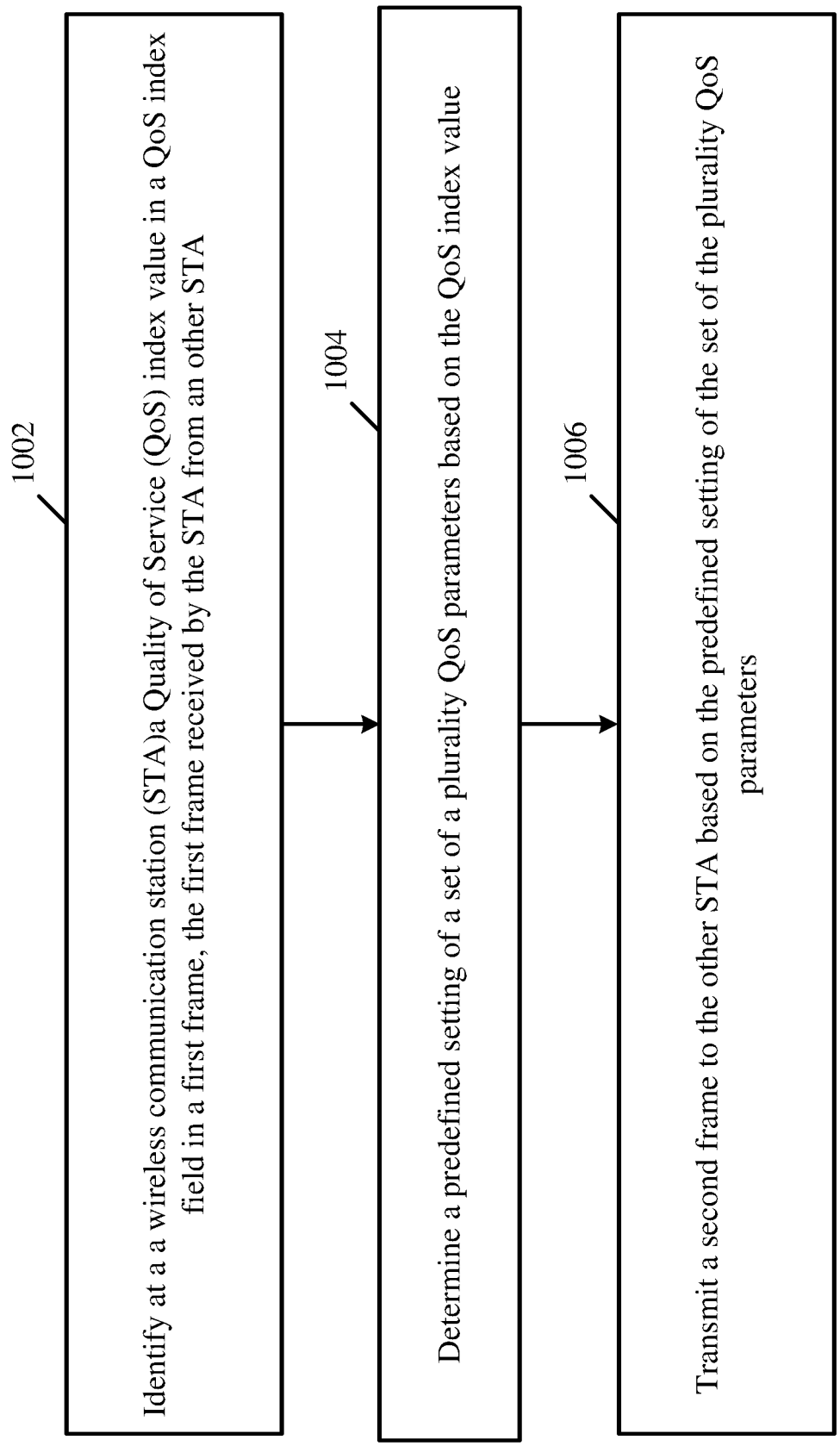
FIG. 10 is a schematic flow-chart illustration of a method of communicating QoS information, in accordance with some demonstrative aspects.

Reference is made to FIG. 10, which schematically illustrates a method of communicating a QoS index, in accordance with some demonstrative aspects. For example, one or more of the operations of the method of FIG. 10 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include identifying at a STA a QoS index value in a QoS index field in a first frame, the first frame received by the STA from an other STA. For example, controller 124 (FIG. 1) may be configured to cause the STA implemented by device 102

(FIG. 1) to identify the QoS index value in the QoS index field in a first frame from the STA implemented by device 140 (FIG. 1), e.g., as described above.

As indicated at block 1004, the method may include determining a predefined setting of a set of a plurality QoS parameters based on the QoS index value. For example, controller 124 (FIG. 1) may be configured to cause the STA implemented by device 102 (FIG. 1) to determine the predefined setting of a set of a plurality QoS parameters based on the QoS index value, e.g., as described above.

As indicated at block 1006, the method may include transmitting a second frame to the other STA, for example, based on the predefined setting of the set of the plurality QoS parameters. For example, controller 124 (FIG. 1) may be configured to cause the STA implemented by device 102 (FIG. 1) to transmit a second frame to the STA implemented by device 140 (FIG. 1), for example, based on the predefined setting of the set of the plurality QoS parameters, e.g., as described above.

Figure 11:
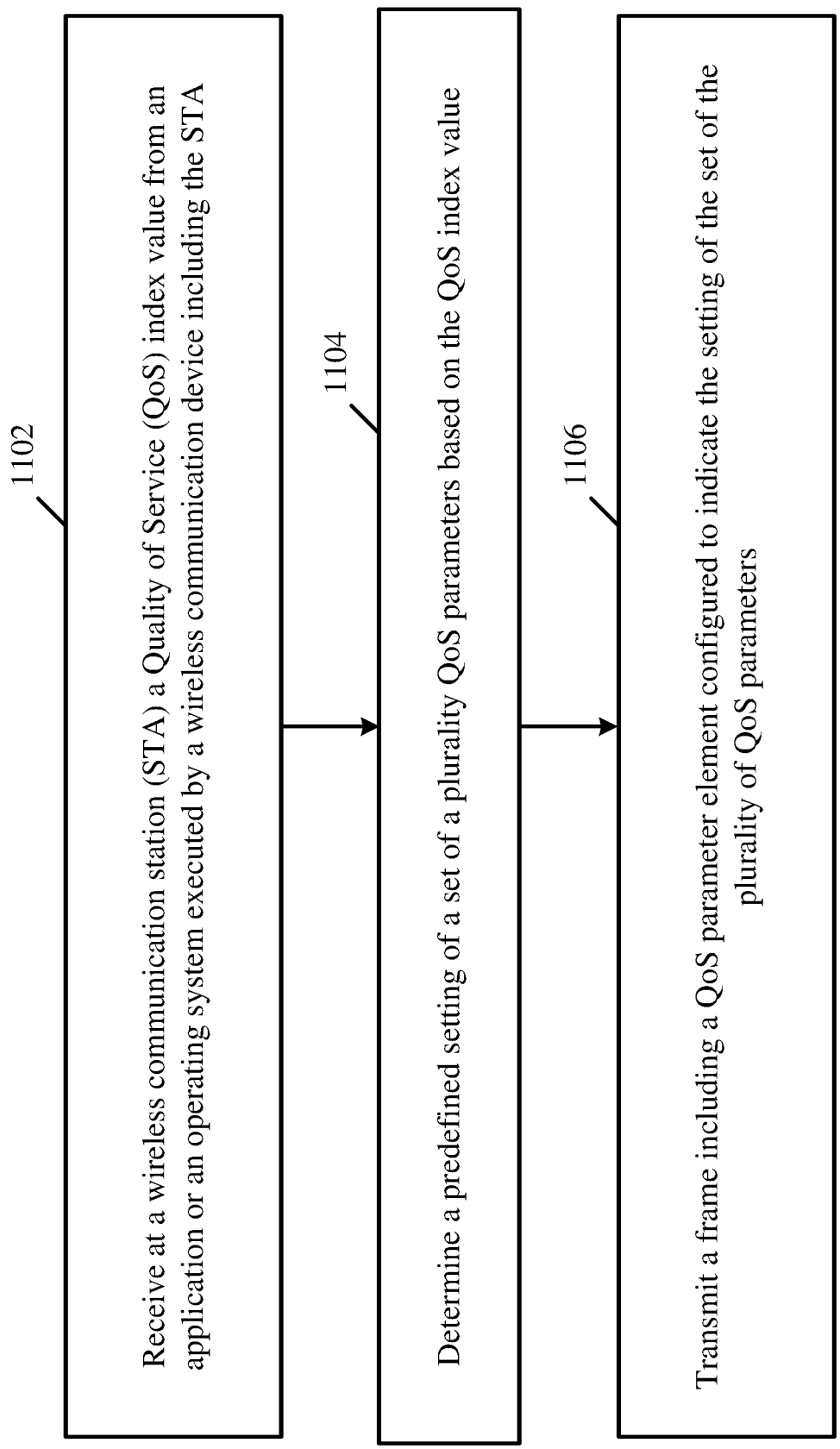
FIG. 11 is a schematic flow-chart illustration of a method of communicating QoS information, in accordance with some demonstrative aspects.

Reference is made to FIG. 11, which schematically illustrates a method of communicating QoS information, in accordance with some demonstrative aspects. For example, one or more of the operations of the method of FIG. 11 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1102, the method may include receiving at a STA a QoS index value from an application or an operating system executed by a wireless communication device including the STA. For example, controller 154 (FIG. 1) may be configured to cause the STA implemented by device 140 (FIG. 1) to process a QoS index value from an application or an operating system executed by device 140 (FIG. 1), e.g., as described above.

As indicated at block 1104, the method may include determining a predefined setting of a set of a plurality QoS parameters, for example, based on the QoS index value. For example, controller 154 (FIG. 1) may be configured to cause the STA implemented by device 140 (FIG. 1) to determine a predefined setting of a set of a plurality QoS parameters based on the QoS index value, e.g., as described above.

As indicated at block 1106, the method may include transmitting from the STA a frame including a QoS parameter element configured to indicate the setting of the set of the plurality of QoS parameters, e.g., according to the QoS index value. For example, controller 154 (FIG. 1) may be configured to cause the STA implemented by device 140 (FIG. 1) to transmit a frame, e.g., to the device 102 (FIG. 1), including a QoS parameter element configured to indicate the setting of the set of the plurality of QoS parameters, e.g., according to the QoS index value from the application or OS of device 140 (FIG. 1).

Figure 12:
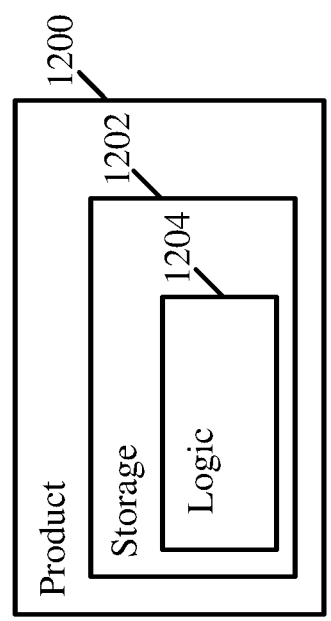
FIG. 12 is a schematic illustration of a product of manufacture, in accordance with some demonstrative aspects.

Reference is made to FIG. 12, which schematically illustrates a product of manufacture 1200, in accordance with some demonstrative aspects. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1-11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1200 and/or machine-readable storage media 1202 may include one or more types of computer-readable storage media capable of storing data, including volatile memory, non-volatile memory, removable or non-removable memory, erasable or non-erasable memory, writeable or re-writeable memory, and the like. For example, machine-readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause wireless communication station (STA) to set a Quality of Service (QoS) index value in a QoS index field to indicate a predefined setting of a set of a plurality QoS parameters; and transmit a frame comprising the QoS index field.

Example 2 includes the subject matter of Example 1, and optionally, wherein the apparatus is configured to cause the STA to set a QoS index element comprising an element Identifier (ID) field, a length field, and the QoS index field comprising the QoS index value, and to set the QoS index element in the frame.

Example 3 includes the subject matter of Example 1 or 2, and optionally, wherein the frame comprises a Stream Classification Service (SCS) descriptor element, the SCS descriptor element comprising the QoS index field.

Example 4 includes the subject matter of Example 3, and optionally, wherein the SCS descriptor element comprises an element identifier (ID) field, a length field after the element ID field, an SCS ID field after the length field, and a request type field after the SCS ID field, wherein the QoS index field is after the SCS ID field.

Example 5 includes the subject matter of Example 1 or 2, and optionally, wherein the frame comprises a QoS parameter element, the QoS parameter element comprising the QoS index field.

Example 6 includes the subject matter of Example 5, and optionally, wherein the QoS parameter element comprises an element identifier (ID) field, a length field after the element ID field, and a plurality of QoS parameter fields after the length field, wherein the plurality of QoS parameter fields comprises the QoS index field.

Example 7 includes the subject matter of Example 6, and optionally, wherein the plurality of QoS parameter fields comprises a minimum service interval field, a maximum service interval field, and a delay bound field.

Example 8 includes the subject matter of any one of Examples 1-7, and optionally, wherein the set of the plurality QoS parameters comprises at least one of a packet delay budget, or a packet error rate.

Example 9 includes the subject matter of any one of Examples 1-8, and optionally, wherein the set of the plurality QoS parameters comprises at least one of a priority level, a pre-emption capability and vulnerability, a user priority, flow-bit rates, or a maximum data burst volume.

Example 10 includes the subject matter of any one of Examples 1-9, and optionally, wherein the apparatus is configured to cause the STA to set a QoS parameter element in the frame to indicate an alternate QoS parameter setting to be used as an alternative to the setting of one or more QoS parameters in the set of the plurality of QoS parameters indicated by the QoS index value.

Example 11 includes the subject matter of any one of Examples 1-10, and optionally, wherein the apparatus is configured to cause the STA to select the QoS index value from a plurality of predefined QoS index values based on one or more QoS requirements for wireless communication of traffic between the STA and another STA.

Example 12 includes the subject matter of Example 11, and optionally, wherein the plurality of predefined QoS index values represent a respective plurality of different predefined settings of the set of the plurality QoS parameters.

Example 13 includes the subject matter of Example 11 or 12, and optionally, wherein the plurality of predefined QoS index values comprises a first QoS index value corresponding to first QoS requirements of a first traffic type, and a second QoS index value corresponding to second QoS requirements of a second traffic type, wherein the second traffic type is different from the first traffic type, and the second QoS requirements are different from the first QoS requirements.

Example 14 includes the subject matter of any one of Examples 11-13, and optionally, wherein the plurality of predefined QoS index values comprises a first QoS index value corresponding to first QoS requirements for a first channel condition of a wireless communication channel to communicate the traffic, and a second QoS index value corresponding to second QoS requirements for a second channel condition, wherein the second channel condition is different from the first channel condition, and the second QoS requirements are different from the first QoS requirements.

Example 15 includes the subject matter of any one of Examples 1-14, and optionally, wherein the frame comprises a Stream Classification Service (SCS) frame of an SCS procedure.

Example 16 includes the subject matter of Example 15, and optionally, wherein the SCS frame comprises an SCS request frame or an SCS response frame.

Example 17 includes the subject matter of any one of Examples 1-16, and optionally, wherein the QoS index field comprises a Wireless QoS Index (WQI) field.

Example 18 includes the subject matter of any one of Examples 1-17, and optionally, wherein the STA comprises a non Access Point (non-AP) STA.

Example 19 includes the subject matter of any one of Examples 1-17, and optionally, wherein the STA comprises an Access Point (AP) STA.

Example 20 includes the subject matter of any one of Examples 1-18, and optionally, comprising at least one radio to transmit the frame.

Example 21 includes the subject matter of Example 20, and optionally, comprising one or more antennas connected to the radio, and a processor to execute instructions of an operating system of the STA.

Example 22 includes an apparatus comprising logic and circuitry configured to a wireless communication station (STA) to identify a Quality of Service (QoS) index value in a QoS index field in a first frame, the first frame received by the STA from an other STA; determine a predefined setting of a set of a plurality QoS parameters based on the QoS index value; and transmit a second frame to the other STA based on the predefined setting of the set of the plurality QoS parameters.

Example 23 includes the subject matter of Example 22, and optionally, wherein the first frame comprises a QoS index element comprising an element Identifier (ID) field, a length field, and the QoS index field comprising the QoS index value.

Example 24 includes the subject matter of Example 22 or 23, and optionally, wherein the first frame comprises a Stream Classification Service (SCS) descriptor element, the SCS descriptor element comprising the QoS index field.

Example 25 includes the subject matter of Example 24, and optionally, wherein the SCS descriptor element comprises an element identifier (ID) field, a length field after the element ID field, an SCS ID field after the length field, and a request type field after the SCS ID field, wherein the QoS index field is after the SCS ID field.

Example 26 includes the subject matter of Example 22 or 23, and optionally, wherein the first frame comprises a QoS parameter element, the QoS parameter element comprising the QoS index field.

Example 27 includes the subject matter of Example 26, and optionally, wherein the QoS parameter element comprises an element identifier (ID) field, a length field after the element ID field, and a plurality of QoS parameter fields after the length field, wherein the plurality of QoS parameter fields comprises the QoS index field.

Example 28 includes the subject matter of Example 27, and optionally, wherein the plurality of QoS parameter fields comprises a minimum service interval field, a maximum service interval field, and a delay bound field.

Example 29 includes the subject matter of any one of Examples 22-28, and optionally, wherein the set of the plurality QoS parameters comprises at least one of a packet delay budget, or a packet error rate.

Example 30 includes the subject matter of any one of Examples 22-29, and optionally, wherein the set of the plurality QoS parameters comprises at least one of a priority level, a pre-emption capability and vulnerability, a user priority, flow-bit rates, or a maximum data burst volume.

Example 31 includes the subject matter of any one of Examples 22-30, and optionally, wherein the apparatus is configured to cause the STA to identify based on a QoS parameter element in the first frame an alternate QoS parameter setting to be used as an alternative to the setting of one or more QoS parameters in the set of the plurality of QoS parameters indicated by the QoS index value.

Example 32 includes the subject matter of any one of Examples 22-31, and optionally, wherein the apparatus is configured to cause the STA to select the predefined setting of the set of the plurality QoS parameters corresponding to the QoS index value from a plurality of different predefined settings of the set of the plurality QoS parameters, wherein the plurality of different predefined settings of the set of the plurality QoS parameters correspond to a respective plurality of predefined QoS index values.

Example 33 includes the subject matter of Example 32, and optionally, wherein the plurality of predefined QoS index values comprises a first QoS index value corresponding to first QoS requirements of a first traffic type, and a second QoS index value corresponding to second QoS requirements of a second traffic type, wherein the second traffic type is different from the first traffic type, and the second QoS requirements are different from the first QoS requirements.

Example 34 includes the subject matter of Example 32 or 33, and optionally, wherein the plurality of predefined QoS index values comprises a first QoS index value corresponding to first QoS requirements for a first channel condition of a wireless communication channel to communicate traffic with the other STA, and a second QoS index value corresponding to second QoS requirements for a second channel condition, wherein the second channel condition is different from the first channel condition, and the second QoS requirements are different from the first QoS requirements.

Example 35 includes the subject matter of any one of Examples 22-34, and optionally, wherein the first frame and the second frame comprise Stream Classification Service (SCS) frames of an SCS procedure.

Example 36 includes the subject matter of Example 35, and optionally, wherein the first frame comprises an SCS request frame and the second frame comprises an SCS response frame.

Example 37 includes the subject matter of any one of Examples 22-36, and optionally, wherein the QoS index field comprises a Wireless QoS Index (WQI) field.

Example 38 includes the subject matter of any one of Examples 22-37, and optionally, wherein the STA comprises an Access Point (AP).

Example 39 includes the subject matter of any one of Examples 22-37, and optionally, wherein the STA comprises a non Access Point (non-AP) STA.

Example 40 includes the subject matter of any one of Examples 22-39, and optionally, comprising at least one radio to transmit the second frame.

Example 41 includes the subject matter of Example 40, and optionally, comprising one or more antennas connected to the radio, and a processor to execute instructions of an operating system of the STA.

Example 42 includes an apparatus comprising logic and circuitry configured to cause wireless communication station (STA) to receive a Quality of Service (QoS) index value from an application or an operating system executed by a wireless communication device comprising the STA; determine a predefined setting of a set of a plurality QoS parameters based on the QoS index value; and transmit a frame comprising a QoS parameter element configured to indicate the setting of the set of the plurality of QoS parameters.

Example 43 includes the subject matter of Example 42, and optionally, wherein the set of the plurality QoS parameters comprises at least one of a packet delay budget, or a packet error rate.

Example 44 includes the subject matter of Example 42 or 43, and optionally, wherein the set of the plurality QoS parameters comprises at least one of a priority level, a pre-emption capability and vulnerability, a user priority, flow-bit rates, or a maximum data burst volume.

Example 45 includes the subject matter of any one of Examples 42-44, and optionally, wherein the apparatus is configured to cause the STA to select the predefined setting of the set of the plurality QoS parameters corresponding to the QoS index value from a plurality of different predefined settings of the set of the plurality QoS parameters, wherein the plurality of different predefined settings of the set of the plurality QoS parameters correspond to a respective plurality of predefined QoS index values.

Example 46 includes the subject matter of Example 45, and optionally, wherein the plurality of predefined QoS index values comprises a first QoS index value corresponding to first QoS requirements of a first traffic type, and a second QoS index value corresponding to second QoS requirements of a second traffic type, wherein the second traffic type is different from the first traffic type, and the second QoS requirements are different from the first QoS requirements.

Example 47 includes the subject matter of Example 45 or 46, and optionally, wherein the plurality of predefined QoS index values comprises a first QoS index value corresponding to first QoS requirements for a first channel condition of a wireless communication channel to communicate the traffic of the STA, and a second QoS index value corresponding to second QoS requirements for a second channel condition, wherein the second channel condition is different from the first channel condition, and the second QoS requirements are different from the first QoS requirements.

Example 48 includes the subject matter of any one of Examples 42-47, and optionally, wherein the frame comprises a Stream Classification Service (SCS) frame of an SCS procedure.

Example 49 includes the subject matter of Example 48, and optionally, wherein the SCS frame comprises an SCS request frame or an SCS response frame.

Example 50 includes the subject matter of any one of Examples 42-49, and optionally, wherein the STA comprises a non Access Point (non-AP) STA.

Example 51 includes the subject matter of any one of Examples 42-49, and optionally, wherein the STA comprises an Access Point (AP) STA.

Example 52 includes the subject matter of any one of Examples 42-51, and optionally, comprising at least one radio to transmit the frame.

Example 53 includes the subject matter of Example 52, and optionally, comprising one or more antennas connected to the radio, and a processor to execute instructions of the operating system.

Example 54 comprises a wireless communication device comprising the apparatus of any of Examples 1-53.

Example 55 comprises an apparatus comprising means for executing any of the described operations of any of Examples 1-53.

Example 56 comprises a product comprising one or more tangible computer-readable non-transitory storage media comprising computer-executable instructions operable to, when executed by at least one processor, enable the at least one processor to cause a wireless communication device to perform any of the described operations of any of Examples 1-53.

Example 57 comprises an apparatus comprising: a memory interface; and processing circuitry configured to: perform any of the described operations of any of Examples 1-53.

Example 58 comprises a method comprising any of the described operations of any of Examples 1-53.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station (STA) to:
   select a Quality of Service (QOS) index value from a plurality of predefined QoS index values based on one or more QoS requirements for wireless communication of traffic between the STA and another STA, wherein the plurality of predefined QoS index values represent a respective plurality of different predefined settings of a set of a plurality of QoS parameters;
   set the QoS index value in a QoS index field, the QoS index value to indicate a predefined setting of the set of the plurality of QoS parameters; and
   transmit a frame comprising the QoS index field.

2. The apparatus of claim 1 configured to cause the STA to set a QoS index element comprising an element Identifier (ID) field, a length field, and the QoS index field comprising the QoS index value, and to set the QoS index element in the frame.

3. The apparatus of claim 1, wherein the frame comprises a Stream Classification Service (SCS) descriptor element, the SCS descriptor element comprising the QoS index field.

4. The apparatus of claim 3, wherein the SCS descriptor element comprises an element identifier (ID) field, a length field after the element ID field, an SCS ID field after the length field, and a request type field after the SCS ID field, wherein the QoS index field is after the SCS ID field.

5. The apparatus of claim 1, wherein the frame comprises a QoS parameter element, the QoS parameter element comprising the QoS index field.

6. The apparatus of claim 5, wherein the QoS parameter element comprises an element identifier (ID) field, a length field after the element ID field, and a plurality of QoS parameter fields after the length field, wherein the plurality of QoS parameter fields comprises the QoS index field.

7. The apparatus of claim 6, wherein the plurality of QoS parameter fields comprises a minimum service interval field, a maximum service interval field, and a delay bound field.

8. The apparatus of claim 1, wherein the set of the plurality of QoS parameters comprises at least one of a packet delay budget, or a packet error rate.

9. The apparatus of claim 1, wherein the set of the plurality of QoS parameters comprises at least one of a priority level, a pre-emption capability and vulnerability, a user priority, flow-bit rates, or a maximum data burst volume.

10. The apparatus of claim 1 configured to cause the STA to set a QoS parameter element in the frame to indicate an alternate QoS parameter setting to be used as an alternative to the setting of one or more QoS parameters in the set of the plurality of QoS parameters indicated by the QoS index value.

11. The apparatus of claim 1, wherein the QoS index value is configured to indicate the predefined setting of the set of the plurality of QoS parameters comprising an assignment of a set of a plurality of predefined values to the set of the plurality of QoS parameters, respectively.

12. The apparatus of claim 1, wherein the plurality of predefined QoS index values comprises a first predefined QoS index value representing a first predefined setting of the set of the plurality of QoS parameters, and a second predefined QoS index value representing a second predefined setting, different from the first predefined setting, of the set of the plurality of QoS parameters.

13. The apparatus of claim 1, wherein the plurality of predefined QoS index values comprises a first QoS index value corresponding to first QoS requirements of a first traffic type, and a second QoS index value corresponding to second QoS requirements of a second traffic type, wherein the second traffic type is different from the first traffic type, and the second QoS requirements are different from the first QoS requirements.

14. The apparatus of claim 1, wherein the plurality of predefined QoS index values comprises a first QoS index value corresponding to first QoS requirements for a first channel condition of a wireless communication channel to communicate the traffic, and a second QoS index value corresponding to second QoS requirements for a second channel condition, wherein the second channel condition is different from the first channel condition, and the second QoS requirements are different from the first QOS requirements.

15. The apparatus of claim 1, wherein the frame comprises a Stream Classification Service (SCS) frame of an SCS procedure.

16. The apparatus of claim 1, wherein the QoS index field comprises a Wireless QOS Index (WQI) field.

17. The apparatus of claim 1 comprising at least one radio to transmit the frame.

18. The apparatus of claim 17 comprising one or more antennas connected to the radio, and a processor to execute instructions of an operating system of the STA.

19. An apparatus comprising logic and circuitry configured to cause a wireless communication station (STA) to:
    identify a Quality of Service (QOS) index value in a QoS index field in a first frame, the first frame received by the STA from an other STA;
    determine a predefined setting of a set of a plurality of QoS parameters based on the QoS index value by selecting the predefined setting of the set of the plurality of QoS parameters corresponding to the QoS index value from a plurality of different predefined settings of the set of the plurality of QoS parameters, wherein the plurality of different predefined settings of the set of the plurality of QoS parameters correspond to a respective plurality of predefined QoS index values; and
    transmit a second frame to the other STA based on the predefined setting of the set of the plurality of QoS parameters.

20. The apparatus of claim 19, wherein the first frame comprises a Stream Classification Service (SCS) descriptor element, the SCS descriptor element comprising the QoS index field.

21. The apparatus of claim 19 configured to cause the STA to determine the predefined setting of the set of the plurality of QoS parameters by determining an assignment of a set of a plurality of predefined values to the set of the plurality of QoS parameters, respectively, based on the QoS index value.

22. An apparatus comprising logic and circuitry configured to cause a wireless communication station (STA) to:
    receive a Quality of Service (QOS) index value from an application or an operating system executed by a wireless communication device comprising the STA;
    determine a predefined setting of a set of a plurality of QoS parameters based on the QoS index value by selecting the predefined setting of the set of the plurality of QoS parameters corresponding to the QoS index value from a plurality of different predefined settings of the set of the plurality of QoS parameters, wherein the plurality of different predefined settings of the set of the plurality of QoS parameters correspond to a respective plurality of predefined QoS index values; and
    transmit a frame comprising a QoS parameter element configured to indicate the setting of the set of the plurality of QoS parameters.

23. The apparatus of claim 22, wherein the plurality of predefined QoS index values comprises a first predefined QoS index value representing a first predefined setting of the set of the plurality of QoS parameters, and a second predefined QoS index value representing a second predefined setting, different from the first predefined setting, of the set of the plurality of QoS parameters.

24. A product comprising one or more tangible computer-readable non-transitory storage media comprising computer-executable instructions operable to, when executed by at least one processor, enable the at least one processor to cause a wireless communication station (STA) to:
    set a Quality of Service (QOS) index value in a QoS index field, the QoS index value to indicate a predefined setting of a set of a plurality of QoS parameters, the QoS index value selected from a plurality of predefined QoS index values, wherein the plurality of predefined QoS index values represent a respective plurality of different predefined settings of the set of the plurality of QoS parameters; and
    transmit a frame comprising the QoS index field.

25. The product of claim 24, wherein the instructions, when executed, cause the STA to set a QoS index element comprising an element Identifier (ID) field, a length field, and the QoS index field comprising the QoS index value, and to set the QoS index element in the frame.

* * * * *